(12) United States Patent
Chen et al.

(10) Patent No.: US 10,997,948 B2
(45) Date of Patent: May 4, 2021

(54) ELECTRONIC DEVICE WITH ADAPTIVE LIGHTING SYSTEM

(71) Applicant: Apple Inc., Cupertino, CA (US)

(72) Inventors: Cheng Chen, San Jose, CA (US); Nicolas P. Bonnier, Campbell, CA (US); Graham B. Myhre, San Jose, CA (US); Jiaying Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/560,093

(22) Filed: Sep. 4, 2019

(65) Prior Publication Data
US 2020/0098335 A1   Mar. 26, 2020

Related U.S. Application Data

(60) Provisional application No. 62/734,703, filed on Sep. 21, 2018.

(51) Int. Cl.
*G09G 5/10* (2006.01)
*G02B 27/01* (2006.01)
*G09G 3/32* (2016.01)

(52) U.S. Cl.
CPC .............. *G09G 5/10* (2013.01); *G02B 27/017* (2013.01); *G09G 3/32* (2013.01);
(Continued)

(58) Field of Classification Search
CPC .......... G02B 2027/0178; G02B 27/017; G09G 2320/0626; G09G 2320/0666; G09G 2360/144; G09G 3/32; G09G 5/10
See application file for complete search history.

(56) References Cited

U.S. PATENT DOCUMENTS 8,786,675 B2    7/2014  Deering
10,055,887 B1*  8/2018  Gil .......................... H04N 7/183
(Continued)

FOREIGN PATENT DOCUMENTS

CN          106662747 A      5/2017
CN          108089331 A      5/2018
(Continued)

*Primary Examiner* — Chun-Nan Lin
(74) *Attorney, Agent, or Firm* — Treyz Law Group, P.C.; Kendall W. Abbasi

(57) ABSTRACT

A head-mounted device may include a display that generates content and an optical system through which the content is viewable. The head-mounted device may include a lighting system that illuminates a periphery of the optical system. When the user places the device on his or her head in a brightly lit environment, control circuitry may operate the lighting system to provide bright illumination to the user's peripheral vision. The lighting system may gradually decrease in brightness until the user transitions from a bright-adapted state to a dark-adapted state. When the user is partially or fully dark-adapted, the lighting system may be turned off and the display may be turned on. In some arrangements, an ambient light sensor may measure ambient light conditions outside of the electronic device and the control circuitry may control the lighting system based on the ambient lighting conditions.

20 Claims, 5 Drawing Sheets

(52) U.S. Cl.
CPC ............... *G02B 2027/0178* (2013.01); *G09G 2320/0626* (2013.01); *G09G 2320/0666* (2013.01); *G09G 2360/144* (2013.01)

(56) References Cited

U.S. PATENT DOCUMENTS

| | | | | |
|---|---|---|---|---|
| 2004/0008166 | A1* | 1/2004 | Kimura | G09G 3/2022 |
| | | | | 345/76 |
| 2011/0181574 | A1* | 7/2011 | Champion | G09G 3/025 |
| | | | | 345/211 |
| 2012/0050140 | A1 | 3/2012 | Border et al. | |
| 2012/0050143 | A1 | 3/2012 | Border et al. | |
| 2018/0136486 | A1* | 5/2018 | Macnamara | A61B 3/14 |
| 2018/0286080 | A1* | 10/2018 | Marshall | G02B 27/017 |

FOREIGN PATENT DOCUMENTS

| | | |
|---|---|---|
| CN | 207780715 U | 8/2018 |
| CN | 108693967 A | 10/2018 |
| JP | 2012186659 A | 9/2012 |
| WO | 2018022521 A1 | 2/2018 |

\* cited by examiner

ELECTRONIC DEVICE WITH ADAPTIVE LIGHTING SYSTEM

This application claims the benefit of provisional patent application No. 62/734,703, filed Sep. 21, 2018, which is hereby incorporated by reference herein in its entirety.

BACKGROUND

This relates generally to displays and, more particularly, to displays for head-mounted devices.

Head-mounted devices such as virtual reality glasses and augmented reality glasses use displays to generate images for a user.

If care is not taken, a head-mounted device may be cumbersome and tiring to wear. The images on the display may appear too dark and washed out when the user first puts the head-mounted device on his or her head. The user may experience dazzle or discomfort when transitioning out of a virtual reality viewing experience. The dynamic range of a head-mounted display may be perceived as insufficient depending on the adaptation state of the user's eyes.

SUMMARY

A head-mounted electronic device configured to be worn on a user's head may include a display that generates display content and an optical system through which the display content is viewable. The head-mounted device may include a lighting system that illuminates a periphery of the optical system. When the user places the device on his or her head in a brightly lit environment, control circuitry may operate the lighting system to provide bright illumination to the user's peripheral vision. The lighting system may gradually decrease in brightness until the user transitions from a bright-adapted state to a dark-adapted state. When the user is partially or fully dark-adapted, the lighting system may be turned off and the display may be turned on. Conversely, when a user is about to remove the device from his or her head, the control circuitry may gradually increase the brightness of the lighting system so that the user can transition from a dark-adapted state to a bright-adapted state before removing the device.

In some arrangements, an ambient light sensor may measure ambient light conditions outside of the electronic device and the control circuitry may control the lighting system based on the ambient lighting conditions.

Control circuitry in the electronic device may estimate a brightness adaptation state of the user that is wearing the electronic device. The control circuitry may adjust a brightness of the lighting system based on the user's adaptation state. This may include, for example, adjusting the brightness of the lighting system based on ambient light conditions, physiological attributes of the user, motion sensor data, gaze position, and/or other information.

The lighting system may include one or more light sources. The light sources may be light-emitting diodes. The control circuitry may be configured to independently control the brightness and/or color of each light source (e.g., some light sources may be turned off while others are turned on, some light sources may have one brightness and others may have a different brightness, etc.).

In some arrangements, the light sources may include red, green, and blue light-emitting diodes or light sources of other colors so that control circuitry can adjust a color of illumination from the lighting system. The color of illumination from the lighting system may, for example, be adjusted to match or more closely match the color of ambient light so that the transition from the ambient light to the head-mounted display light is less abrupt.

The lighting system may include a light source that emits light into a light guide. The light guide may guide the light around a periphery of the optical system via total internal reflection. The light guide may have light extraction features that allow the light to escape from the light guide.

DETAILED DESCRIPTION

Head-mounted devices such as head-mounted displays may be used for virtual reality and augmented reality systems. For example, a pair of virtual reality glasses that is worn on the head of a user may be used to provide a user with virtual reality content.

Figure 1:
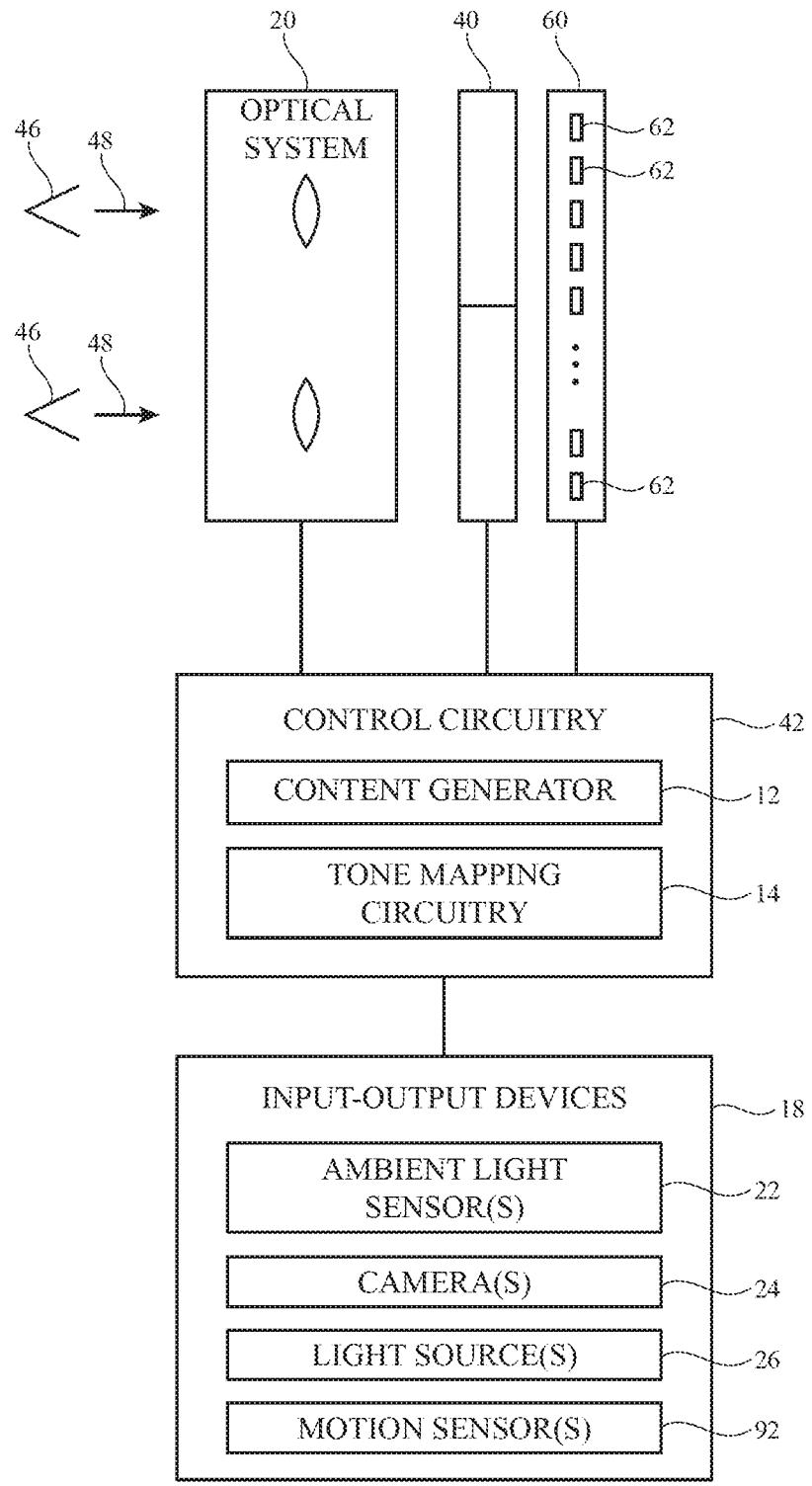
FIG. 1 is a diagram of an illustrative head-mounted device in accordance with an embodiment.

An illustrative system in which a head-mounted device such as a pair of virtual reality glasses is used in providing a user with display content such as virtual reality content is shown in FIG. 1. As shown in FIG. 1, head-mounted device 10 may include a display system such as display system 40 that creates images and may have an optical system such as optical system 20 through which a user (see, e.g., user's eyes 46) may view the images produced by display system 40 in direction 48. Optical system 20 may, for example, include a first lens module (e.g., for a user's left eye) and a second lens module (e.g., for a user's right eye).

Display system 40 may be based on a liquid crystal display, an organic light-emitting diode display, a display having an array of crystalline semiconductor light-emitting diode dies, a liquid-crystal-on-silicon display, a microelectromechanical systems (MEMs) display, and/or displays based on other display technologies. Separate left and right displays may be included in system 40 for the user's left and right eyes or a single display may span both eyes.

Visual content (e.g., image data for still and/or moving images) may be provided to display system 40 using control circuitry 42 that is mounted in head-mounted device 10 and/or control circuitry that is mounted outside of head-mounted device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such as virtual reality content (e.g., computer-generated content associated with a virtual world), pre-recorded video for a movie or other media, or other images.

During operation, a content generator in device 10 such as content generator 12 (e.g., operating system functions and/or applications running on control circuitry 42) may generate content for display system 40 (e.g., virtual reality content, high dynamic range content, standard dynamic range content, etc.). A luminance value mapping circuitry such as tone mapping circuitry 14 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping circuitry 14 may produce tone mapping parameters that are based on the current adaptation level of the user's visual system to use in producing display luminance values for use in displaying images with display system 40. Tone mapping circuitry 14 may be implemented using code running on control circuitry 42 and/or other control circuitry and/or may use hardwired features of the control circuitry in device 10. The tone mapping parameters may be expressed in any suitable format. For example, tone mapping parameters such as adaptation level, black level, reference white level, and/or specular white level may be expressed in $cd/m^2$.

The human visual system is capable of perceiving a large range of luminance levels. However, the human eye cannot see all of these brightness levels at the same time. Rather, the eye continuously adjusts its sensitivity to the viewing environment in order to perceive different ranges of luminance levels within the eye's larger overall dynamic range. The current sensitivity level of the human visual system is sometimes referred to as its brightness adaptation level. The subjective brightness perceived by a user is usually dependent on the user's brightness adaptation level. When the human visual system is bright-adapted (i.e., adapted to bright light), the eye is less sensitive. In contrast, when the human visual system is dark-adapted (i.e., adapted to dim light), the eye is more sensitive.

If care is not taken, a user that is adapted to bright ambient light before using a head-mounted display may initially perceive the images on the display as dim and washed out until the user's eyes adapt to the darkness of the head-mounted display. Conversely, a user that is adapted to the darkness of a head-mounted display may experience dazzle and discomfort when the user removes the head-mounted display and is faced with bright ambient light.

To enhance the user's experience with head-mounted device 10, control circuitry 42 may be configured to determine an adaptation state of the user. A user's adaptation state may be represented by a luminance value or a range of luminance values. Control circuitry 42 may use tone mapping circuitry 14 to adapt display data according to the adaptation state of the user. This may include, for example, matching (e.g., optimizing) a brightness range of display 40 with the current adaptation state of the user, adjusting a brightness range of display 40 to have a desired effect on the user's adaptation state (e.g., to help "guide" the user's current adaptation state to a different adaptation state), adjusting a brightness range at certain periods of time to boost the perceived brightness or darkness at another time, adjusting brightness for some portions of an image to boost the perceived brightness or darkness of other portions of an image, selecting appropriate tone mapping parameters based on the adaptation state of the user, and/or taking other actions based on the estimated adaptation state of the user. Tone mapping circuitry 14 may be configured to adapt display data for left and right displays. The display data adjustment may be the same for both displays or the display data adjustment may be different for the left and right displays. For example, tone mapping circuitry 14 may use different tone mapping curves for the left and right displays to account for different tone mapping needs for the user's left and right eyes, if desired.

In some arrangements, the dynamic range of display 40 may not be large enough to match the user's brightness adaptation state. For example, in a bright outdoor environment, the user's brightness adaptation level may be greater than 20,000 nits. In an overcast outdoor environment or indoors near a bright window, the user's brightness adaptation level may be between 1,000 nits and 3,000 nits. In a bright indoor environment, the user's brightness adaptation level may be between 300 nits and 500 nits. In some of these scenarios, the maximum brightness of display 40 may be less than the brightness adaptation level of the user.

To help device 10 accommodate the adaptation state of the user, device 10 may include lighting system 60. Lighting system 60 may include light-emitting devices 62. Light-emitting devices 62 may be located around the periphery of display 40 and/or optical system 20, above display 40 and/or optical system 20, below display 40 and/or optical system 20, behind display 40 and/or optical system 20, to the left and/or right of display 40 and/or optical system 20, and/or in other locations of device 10. When device 10 is mounted on a user's head, lighting-emitting devices 62 may produce light in the user's peripheral vision.

Lighting system 60 may include any suitable light sources that produce light in response to applied electrical signals such as lamps, light-emitting diodes, lasers, arrays of light sources, individual light sources, backlit or edge-lit light guides, light sources that emit one or more beams of light (e.g., a laser beam, light-emitting diode beam, or a beam associated with another collimated light source), light sources that emit light in a fixed pattern of one or more beams, light sources that emit light using raster scanning techniques, light sources that emit steerable beams (e.g., light sources with mirror arrays to steer light in a light projector system, light sources with one or more steerable mirrors, steerable lasers and light-emitting diodes, etc.), light guide panels and/or pipes that contain light extraction features that cause the light guide panels and/or pipes to emit light in various patterns, and other electrically controlled light sources.

Instead of or in addition to including light sources 62, lighting system 60 may include one or more windows that selectively allow ambient light from the exterior of device 10 to reach the interior of device 10 to help provide a smooth transition from bright lighting conditions to dark lighting conditions and vice versa. For example, lighting system 60 may include one or more apertures through which ambient light may reach the interior of device 10. The apertures may have an adjustable size to let in adjustable amounts of ambient light, may include adjustable filters that can adjust the transparency of the apertures, and/or may be provided with shutters that can selectively open and close the apertures. Control circuitry 42 may be used to control the amount of ambient light that passes through the apertures. This is, however, merely illustrative. If desired, lighting system 60 may include light sources 62 and may not include any apertures.

If desired, light-emitting devices 62 may include colored light sources. For example, devices 62 may include red, green, and blue light-emitting diodes, thereby allowing system 60 to emit light of an adjustable color by adjusting the relative strengths of the red, green, and blue light emitted from devices 62. If desired, light-emitting devices 62 may include blue light-emitting diodes with different wavelengths. A first wavelength of blue light may tend to suppress a user's melatonin production whereas a second wavelength of blue light may have little to no effect on the user's melatonin production. Control circuitry 42 may control the relative brightness of the two blue light sources in system 60 to have a desired effect on the user's circadian rhythm (e.g., by using the first wavelength of blue light in the morning and using the second wavelength of blue light in the evening, for example).

Lighting system 60 may contain individually controlled areas. These areas may be relatively small areas (e.g., pixel-sized areas) and/or may be larger areas. For example, lighting system 60 may contain light-producing devices that produce a single block of light over an entire periphery of device 10. If desired, lighting system 60 may include one or more light diffusion layers (e.g., frosted polymer films, films or substrates with light-scattering particles, etc.).

Lighting system 60 may, if desired, include light guiding structures such as optical fibers and/or other light guiding elements. Light guides in system 60 may be used to guide light from a light source to a location in device 10 where illumination is desired. Light guides in system 60 may, in some arrangements, be transparent and may blend in with a surrounding portion of device 10 (e.g., to generate a uniform appearance).

Control circuitry 42 may control lighting system 60 based on the adaptation state of the user. This may include, for example, matching a brightness range of lighting system 60 with the current adaptation state of the user, adjusting a brightness range of lighting system 60 to have a desired effect on the user's adaptation state (e.g., to help "guide" the user's current adaptation state to a different adaptation state), adjusting a brightness range of lighting system 60 at certain periods of time to boost the perceived brightness or darkness at another time, adjusting brightness of lighting system 60 for a subset of light-emitting devices 62 near one portion of an image on display 40 to boost the perceived brightness or darkness of other portions of an image on display 40, adjusting a color of light emitted by lighting system 60 to match the color of ambient light or to enhance appearance of colors on display 40, and/or taking other actions based on the estimated adaptation state of the user.

Input-output devices 18 may be coupled to control circuitry 42. Input-output devices 18 may be mounted in head-mounted device 10 and/or may be mounted outside of head-mounted device 10 (e.g., in an associated portable electronic device, laptop computer, or other computing equipment). Input-output devices 18 may be used to gather user input from a user, may be used to make measurements on the environment surrounding device 10, may be used to provide output to a user, and/or may be used to supply output to external electronic equipment. Input-output devices 18 may include buttons, joysticks, keypads, keyboard keys, touch sensors, track pads, displays, touch screen displays, microphones, speakers, light-emitting diodes for providing a user with visual output, and sensors (e.g., force sensors, temperature sensors, magnetic sensor, accelerometers, gyroscopes, and/or other sensors for measuring orientation, position, and/or movement of glasses 10, proximity sensors, capacitive touch sensors, strain gauges, gas sensors, pressure sensors, ambient light sensors, and/or other sensors).

Input-output circuitry 18 may include a color ambient light sensor or other ambient light sensor 22 for gathering ambient light measurements (e.g., ambient light levels such as ambient light luminance measurements and/or ambient light color measurements such as color temperature measurements and/or color coordinate measurements). Input-output circuitry 18 may also include cameras 26 (digital image sensors) for capturing images of the user's surroundings, for performing gaze detection operations by viewing eyes 46, and/or other cameras. Input-output devices 18 may include a sensing system that measures characteristics of the user's eyes 46. For example, light source 26 and camera 24 may be used in supplying light to eye 46 and measuring reflected light to measure the optical properties of eye 46. Light source 26 may produce light at any suitable wavelength (e.g., near infrared light wavelengths, longer infrared wavelengths, visible wavelengths, etc.). Camera 24 and/or light source 26 may be used in determining pupil size, blink rate, facial expression, eye openness (e.g., whether the user is squinting), etc. Camera 24 may also be used by control circuitry 42 to gather images of the pupils and other portions of the eyes of the viewer. The locations of the viewer's pupils and the locations of the viewer's pupils relative to the rest of the viewer's eyes may be used to determine the locations of the centers of the viewer's eyes (i.e., the centers of the user's pupils) and the direction of view (gaze direction) of the viewer's eyes.

Input-output device 18 may include one or more motion sensors 92. Motion sensors 92 may include one or more accelerometers, compasses, gyroscopes, barometers, pressure sensors, magnetic sensors, inertial measurement units that contain some or all of these sensors, and/or other sensors for measuring orientation, position, and/or movement of device 10. Motion sensors 30 may produce sensor data that indicates whether device 10 is being place on or removed from a user's head. For example, an upward motion arc or lifting from a surface may indicate that device 10 is being placed on or have been placed on a user's head, whereas a downward motion arc or setting down onto a surface may indicate that device 10 is being removed from or has been removed from a user's head.

Figure 2:
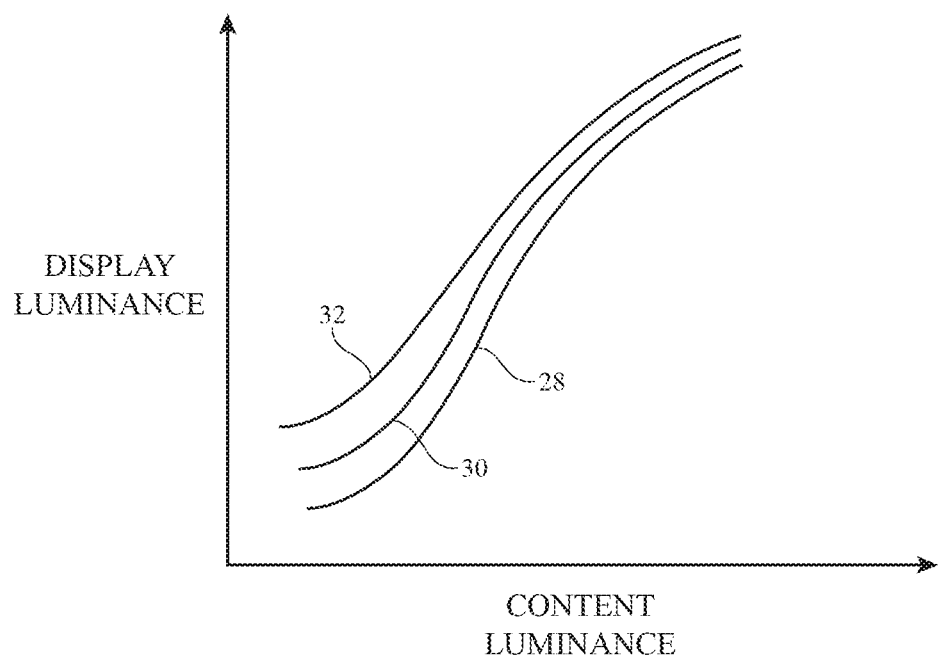
FIG. 2 is a graph showing how content luminance may be mapped to display luminance based on a variety of different brightness adaptation states in accordance with an embodiment.

FIG. 2 is a graph showing how content luminance values for display 40 can be mapped to display luminance values for display 40 by device 10 for three different illustrative adaptation states. The content luminance and display luminance axes of the graph of FIG. 2 have logarithmic scales. In the example of FIG. 2, curve 28 is optimized for a dark adaptation state (e.g., when the user is adapted to a dark environment), curve 30 is optimized for a moderate adaptation state (e.g., when a user is adapted to a lit office or a dim outdoors environment), and curve 32 is optimized for a bright adaptation state (e.g., when a user is adapted to a bright outdoors environment). There may be greater or fewer than three different optimized curves for mapping content luminance values to display luminance values based on the adaptation state of the user. The use of three curves each optimized for one of three adaptation states is merely illustrative.

Tone mapping circuitry 14 may switch from one tone mapping curve to another tone mapping curve based on various factors. In some scenarios, tone mapping circuitry 14 may select the tone mapping curve that is optimized for the user's current adaptation state. For example, when a user first places device 10 on his or her head, the user's eyes may gradually adapt from the bright room environment to the dark viewing conditions of device 10. Tone mapping circuitry 14 may follow the user's adaptation in this scenario, using bright adaptation curve 32 at first and gradually moving to dark adaptation curve 28.

Control circuitry 42 may also control lighting system 60 to follow the user's adaptation state. For example, when the user first puts device 10 on his or her head in a bright room, lighting system 60 may start at a first luminance level (e.g., matching or nearly matching the ambient brightness level) and may gradually shift to a second luminance level. The second luminance level may be less than the first luminance level. If desired, lighting system 60 may be turned off after the user is dark-adapted to the interior of device 10 (i.e., the second luminance level may be zero).

If desired, control circuitry 42 may also adjust the color temperature of lighting system 60. For example, when the user first puts device 10 on his or her head in an environment with cool ambient lighting (e.g., bluish ambient lighting), lighting system 60 may start at a first color temperature (e.g., a first color temperature corresponding to a cool white that matches or nearly matches the color of ambient light) and may gradually shift to a second color temperature. The second color temperature may be different from the first color temperature. For example, the second color temperature may be lower than the first color temperature (e.g., the second color temperature may correspond to a warm white). This is, however, merely illustrative. If desired, control circuitry 42 may only adjust the brightness of lighting system 60 without adjusting the color temperature of lighting system 60.

In some scenarios, tone mapping circuitry 14 and/or lighting system 60 may be used to drive or guide a user's adaptation from its current state to a different state. For example, when a video that the user is watching ends, when the user enters a home screen, or when a user otherwise indicates that he or she is transitioning out of the virtual reality experience, tone mapping circuitry 14 may adjust display data and control circuitry 42 may control lighting system 60 to gradually shift the user's adaptation state from dark-adapted to bright-adapted to avoid any dazzle or discomfort when the user removes device 10. In this type of scenario, tone mapping circuitry 14 may use dark adaptation curve 28 at first and gradually move to bright adaptation curve 32, thereby causing the user's eyes to slowly become bright-adapted.

In some scenarios, control circuitry 42 may control the brightness and/or color temperature of lighting system 60 to enhance the images on display 40. For example, lighting system 60 may produce magenta lighting to enhance the appearance of green colors on display 40. As another example, a first set of light-emitting devices 62 in lighting system 60 may be illuminated near a first portion of an image on display 40 while a second set of light-emitting devices 62 in lighting system 60 near a second portion of an image on display 40 may be left unilluminated, which in turn may result in a perceived contrast boost in the second portion of the image.

Figure 3:
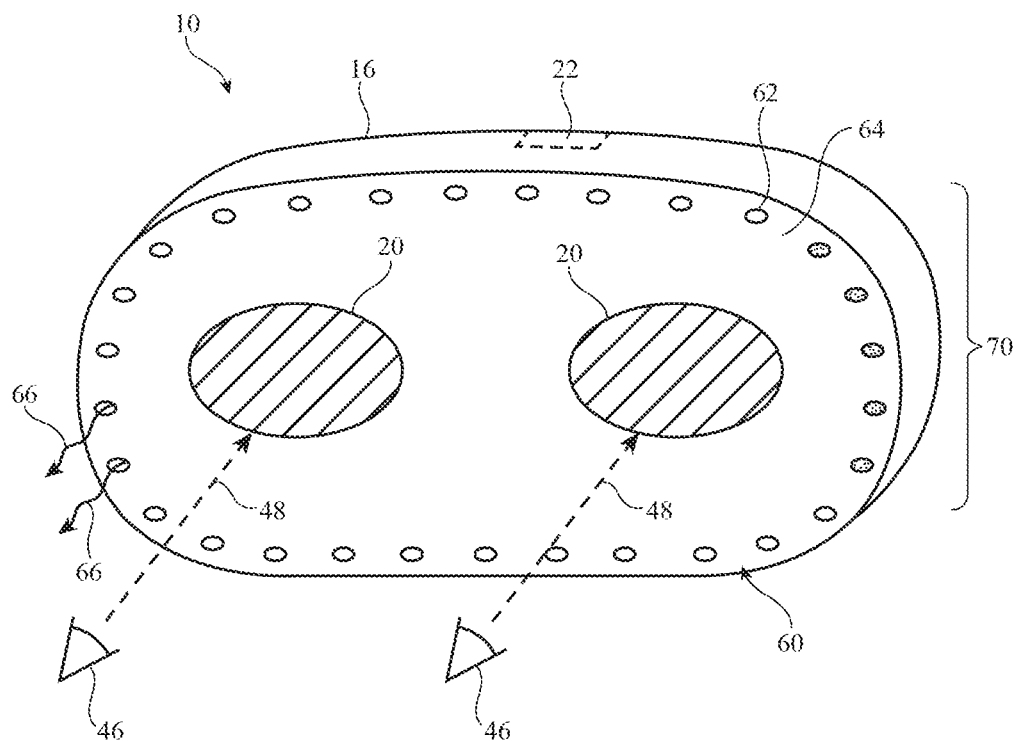
FIG. 3 is a perspective view of an illustrative head-mounted device having a lighting system that illuminates a periphery of an optical system in accordance with an embodiment.

FIG. 3 is a perspective view of an illustrative device 10 having a lighting system such as lighting system 60. Device 10 may include inner and outer surfaces such as outer surface 16 and inner surface 64. Inner surface 64 may face the user's eyes 46 when the user is wearing device 10 and viewing displays 40 (not shown in FIG. 3) through optical system 20 in direction 48. Ambient light sensor 22 may be configured to measure the brightness and/or color of ambient light outside of device 10.

Lighting system 60 may include light-emitting devices 62 on inner surface 64 of device 10. Light-emitting devices 62 may emit light 66 towards the user's peripheral vision. In the example of FIG. 3, light-emitting devices 62 are distributed in a loop surrounding the periphery of optical system 20. This is merely illustrative. If desired, light-emitting devices 62 may be distributed in a first loop surrounding a left-eye portion of optical system 20 and a second loop surrounding a right-eye portion of optical system 20. If desired, light-emitting devices 62 may be located elsewhere in device 10. There may be one, two, three, four, ten, twenty, fifty, more than fifty, or less than fifty light-emitting devices 62 in system 60.

Control circuitry 42 may control all of light-emitting devices 62 in unison or may control all or some of light-emitting devices 62 independently of one another. For example, control circuitry 42 may set one or more light-emitting devices 62 (e.g., light-emitting devices 62 in region 70) at a first brightness level while setting other light-emitting devices 62 at a second brightness level different from the first brightness level.

The example of FIG. 3 in which light-emitting devices 62 emit light 66 directly out of device 10 towards a user's peripheral vision is merely illustrative. If desired, light-emitting devices 62 may emit light into a light guide (e.g., a light guide pipe or light guide panel) that guides the light to a different location via total internal reflection. This type of arrangement is illustrated in FIG. 4.

Figure 4:
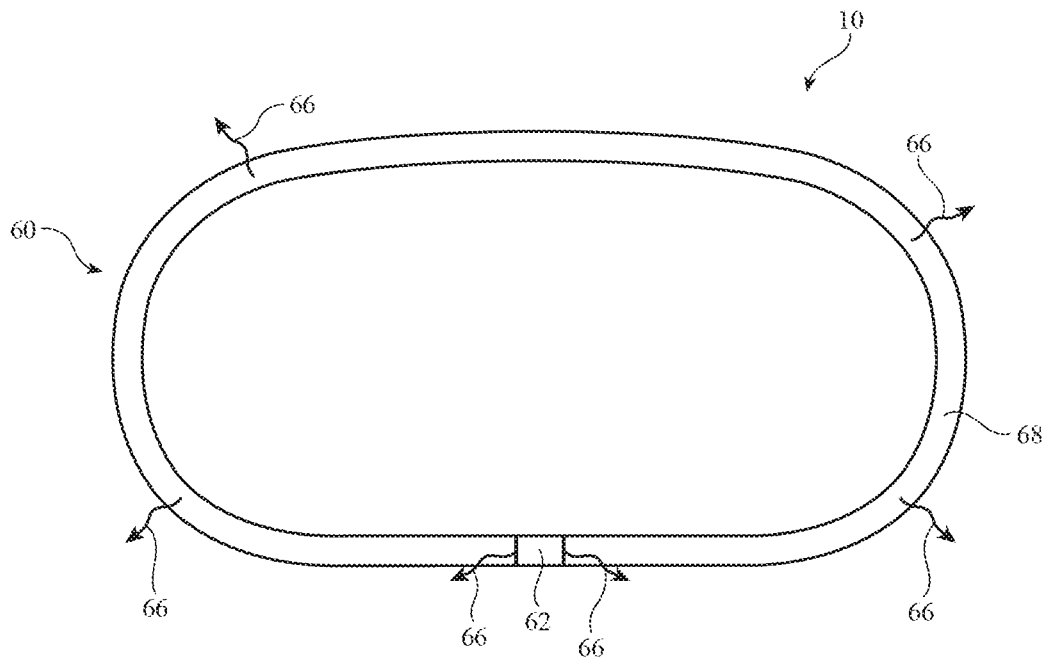
FIG. 4 is a front view of an illustrative head-mounted device having a lighting system that includes a light source and a light guide in accordance with an embodiment.

As shown in FIG. 4, light-emitting device 62 may emit light 66 into a light guide such as light guide 68. Light guide 68 may be a fiber, a molded plastic structure, or other light guiding structure that guides light internally in accordance with the principle of total internal reflection. Light guide 68 may be formed from clear plastic, glass, sapphire or other transparent crystalline materials, or other transparent materials. In some configurations, light guides 68 may have inner structures (sometimes referred to as cores) that are coated with one or more outer layers (sometimes referred to as claddings or coating layers). In this type of arrangement, the core may have a higher index of refraction than the cladding to promote total internal reflection of the light that has been coupled into light guide 68. High/low index of refraction arrangements may also be created by embedding a light guide structure of a first index of refraction into a transparent material of a second index of refraction that is higher than the first index of refraction. The transparent material into which the light guide structure is embedded may be a polymer or other clear binder.

In general, light guides such as light guide 68 may be formed by injection molding, by machining plastic light guide structures, by dipping or spraying polymer coatings onto machined or molded plastic core parts or glass core parts, by extruding polymers, by elongating glass or plastic rods using heat and tension, or by otherwise forming structures that can internally guide light within device 10. With one suitable arrangement, which may sometimes be described herein as an example, light guide 68 is an optical fiber having a circular cross-sectional shape with a central core surrounded by a cladding layer of lower index of refraction material. Light guide 68 may be formed form glass, plastic, or other transparent material. Arrangements in which light guide 68 has a non-circular cross-sectional shape may also be used.

In regions of light guide 68 where illumination is desired, light guide 68 may have light extraction features such as particles, changes in refractive index, roughened surfaces, protrusions such as bumps or ridges, recesses such as pits or grooves, or other light extraction features. In the presence of light extraction features in light guide 68, light 66 from the interior of light guide 68 may be scattered out of light guide 68. If desired, some portions of light guide 68 may be free of light extraction features so that light 66 propagates through and is contained within that portion of light guide 68 via total internal reflection.

Figure 5:
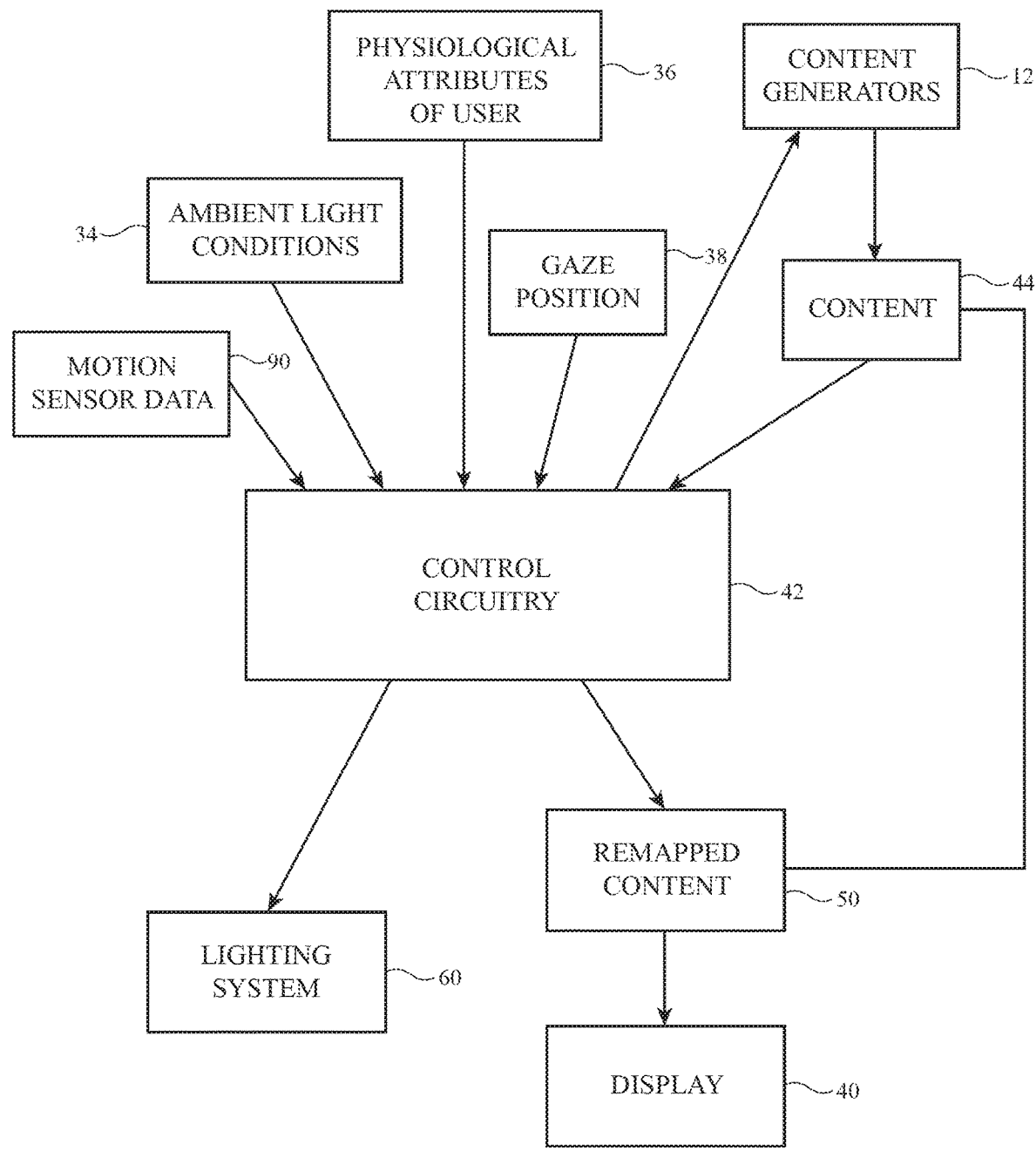
FIG. 5 is a diagram showing how control circuitry may use information from sensors and other input-output devices to determine operating conditions for a lighting system and to determine tone mapping parameters for a display in accordance with an embodiment.

FIG. 5 is a diagram showing how control circuitry 42 may use information from input-output devices 18 and/or other devices to determine operating conditions for lighting system 60 and to determine tone mapping parameters for display 40. Control circuitry 42 may receive inputs such as ambient light conditions 34, physiological attributes 36 of a user, motion sensor data 90, gaze position 38, and display content (e.g., display content 44 and/or remapped content 50). Control circuitry 42 may control lighting system 60 based on one or more of these inputs.

Ambient light conditions 34 may include an ambient light brightness and/or an ambient light color measured with ambient light sensor 22. The measured ambient light information 34 may be indicative of the user's adaptation state when the user puts device 10 on his or her head. Control circuitry 42 may control lighting system 60 based ambient light information 34. For example, if ambient light sensor conditions 34 indicate bright ambient light, control circuitry 42 may illuminate lighting system 60 with bright light so that images on display 40 appear sufficiently bright to the user when display 40 is turned on. Control circuitry 42 may gradually reduce the brightness of lighting system 60 as the user adapts to the dark viewing conditions of device 10.

Control circuitry 42 (e.g., tone mapping circuitry 14 of FIG. 1) may also determine tone mapping parameters for display 40 based on ambient light conditions 34. For example, if ambient light sensor conditions 34 indicate bright ambient light, tone mapping circuitry 14 may begin with bright-adapted curve 32 so that the images appear sufficiently bright to the user. Tone mapping circuitry 14 may gradually shift to tone mapping parameters that are optimized for a dark adaptation state as the user adapts to the dark viewing conditions of device 10.

Physiological attributes 36 may include a pupil size, blink rate, facial expression, eye openness, and/or other information that may indicate the user's adaptation state. For example, as a user's eyes adapt to dark ambient conditions, the pupils may become larger, the blink rate may decrease, a distance between eyes and cheeks may decrease as the face relaxes, and eyes may squint less. These physiological attributes may be measured (e.g., using camera 24 and/or light emitter 26) and used by control circuitry 42 to determine operating conditions for lighting system 60 and to determine tone mapping parameters for display 40. In addition to being indicative of a user's adaptation state, physiological attributes 36 may also be indicative of the user's fatigue level. Users may experience fatigue after viewing images on a head-mounted display for extended periods of time. If desired, control circuitry 42 may use physiological attributes 36 to determine a fatigue level of the user and may adjust lighting system 60 and/or display 40 accordingly. For example, control circuitry 42 may darken lighting system 60 and/or may darken display 40 when a user is showing signs of a fatigue to make the viewing experience more comfortable.

Control circuitry 42 may use motion sensor data 90 from motion sensor 92 of FIG. 1 to determine operating conditions for lighting system 60 and/or to determine tone mapping parameters for display 40. Motion sensor data 90 may, for example, be used to determine when device 10 is being placed on or removed from a user's head. When motion sensor data 90 indicates that device 10 is being placed on a user's head, control circuitry 42 may turn on lighting system 60 so that the user's transition from bright ambient light conditions to dark head-mounted display viewing conditions is less abrupt. Similarly, if motion sensor data 90 indicates that device 10 is being removed form a user's head, control circuitry 42 may turn on lighting system 60 so that the user's transition from dark head-mounted display viewing conditions to bright ambient light conditions is less abrupt.

Gaze position 38 may also be used to determine appropriate operating conditions for lighting system 60 and/or display 40. If the viewer's gaze is directed towards a bright portion of the image, the user may be slightly bright-adapted, whereas a viewer that is gazing towards a dark portion of the image may be more dark-adapted. Control circuitry 42 may, if desired, determine which light sources 62 in system 60 to illuminate or turn off based on gaze position 38. Gaze position 38 may be measured using camera 24 to capture images of the viewer's pupils and other portions of the viewer's eyes. Gaze position 38 may be used in combination with the pixel luminance at the gaze location to estimate the user's current adaptation state. This calculation may include, for example, a moving average over the pixel luminance levels around the user's gaze position to estimate user's adaptation state. Pixel luminance at the gaze position 38 may be determined by analyzing frames of image data that are being displayed on display 40 (e.g., by analyzing content 44 and/or remapped content 50).

During operation, content generators 12 may produce content to be displayed on display 40. Content generators 12 may, for example, generate virtual reality content, augmented reality content, and/or mixed reality content. This may include rendering game images in a video game, retrieving stored movie data and providing corresponding video frames to be displayed on display 40, producing still image frames associated with an operating system function or application program, and/or producing other content for displaying on display 40.

Control circuitry 42 may use information on ambient conditions 34, physiological attributes 36, motion sensor data 90, gaze position 38, and/or content 44 and 50 to determine operating conditions for lighting system 60 and/or display 40. For example, control circuitry 42 may determine a brightness level and color temperature for each light-emitting device 62 in lighting system 60 based on one or more of ambient conditions 34, physiological attributes 36, motion sensor data 90, gaze position 38, content 44, and content 50.

Tone mapping circuitry 14 in control circuitry 42 may determine how original content values should be mapped to display content values (e.g., to determine how to map content luminance values to display luminance values in accordance with mapping curves of the type described in connection with FIG. 2) based on one or more of ambient conditions 34, physiological attributes 36, motion sensor data 90, gaze position 38, content 44, and content 50. This is sometimes referred to as adjusting the brightness level of the display. To ensure that content is displayed appropriately on display 40, tone mapping circuitry 14 can provide content generators 12 with tone mapping parameters to use in performing luminance mapping operations and/or tone mapping circuitry 14 can implement luminance mapping for content generators 12.

In some configurations, content generators 12 may be capable of adjusting content luminance values internally. In these situations, tone mapping circuitry 14 can supply content generators 12 with tone mapping parameters. The tone mapping parameters inform content generators 12 of an appropriate mapping curve to use in supplying content 44 to display 40.

In other configurations, content generators 12 may not be capable of adjusting content luminance values internally or it may otherwise be desirable to implement tone mapping separately from the tone mapping functions of content generators 12. In these circumstances, content 44 from content generator 12 may be provided to tone mapping circuitry 14. Tone mapping circuitry 14 may then apply a desired content-luminance-to-display-luminance mapping (e.g., a mapping defined done mapping parameters associated with one of the curves shown in FIG. 2) to ensure that the luminance of content 44 is adjusted appropriately (e.g., so that content 44 is remapped in accordance with a desired content-luminance-to-display luminance mapping to produce corresponding remapped content 50 for displaying on display 40).

Figure 6:
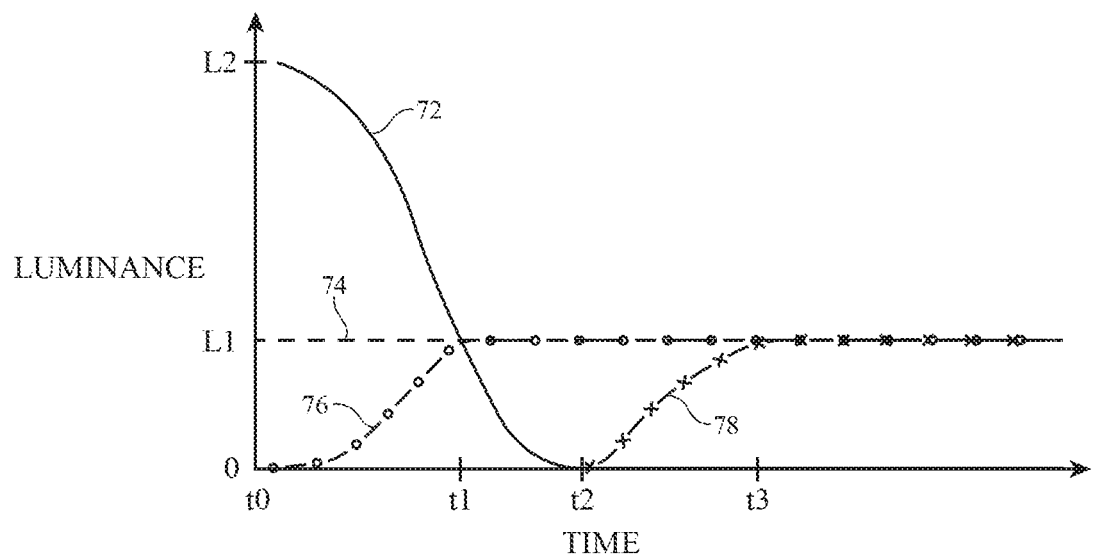
FIG. 6 is a graph showing how a lighting system may be used to help a user transition from a bright-adapted state to a dark-adapted state after a user places a head-mounted device on his or her head in accordance with an embodiment.

FIG. 6 is a graph showing illustrative brightness levels of lighting system 60 and display 40 when a user places device 10 on his or her head at time t0. Curve 72 represents the brightness of lighting system 60, and curves 74, 76, and 78 represent three illustrative brightness curves for display 40. Control circuitry 42 may use ambient light sensor 22 to determine an ambient light brightness. The ambient light brightness may, for example, be equal to or close to luminance level L2. Control circuitry 42 may therefore illuminate lighting system 60 at luminance level L2 at t0 to match the user's adaptation state when the user first puts device 10 on his or her head at time t0. From time t0 to time t1, control circuitry 42 may gradually decrease the brightness of lighting system 60 from L2 to L1. L1 may, for example, be the maximum brightness of display 40. From time t1 to time t2, control circuitry 42 may gradually decrease the brightness of lighting system 60 from L1 to zero. This allows the user to gradually become dark-adapted so that display 40 appears sufficiently bright from time t2 on.

In some arrangements, display 40 may follow brightness curve 74. Brightness curve 74 starts at luminance level L1 at time t0 and remains at L1. The user's brightness adaptation level from time t0 to time t1 may not be as low as brightness curve 74, but the presence of additional illumination from lighting system 40 may help gradually adjust the user's adaptation state so that the user's transition from brightness L2 to L1 is less abrupt.

In other arrangements, display 40 may follow brightness curve 76. Brightness curve 76 starts at zero brightness at time t0, gradually increases to brightness level L1 at time t1, and remains at L1 from t1 on. The user's brightness adaptation level from time t0 to time t1 may not be as low as brightness curve 76, but the presence of additional illumination from lighting system 40 may help gradually adjust the user's adaptation state so that the user's transition from brightness L2 to L1 is less abrupt.

In other arrangements, display 40 may follow brightness curve 78. Brightness curve 78 remains at zero until time t2. Just when lighting system 60 is turned off at time t2, display 40 may be turned on and may gradually increase in brightness from zero at time t2 to L1 at time t3. With this type of arrangement, the user may be fully dark-adapted by the time display 40 is turned on.

The examples of FIG. 6 are merely illustrative. If desired, lighting system 60 and/or display 40 may follow other brightness curves.

Control circuitry 42 may determine operating conditions for display 40 and lighting system 60 based on measured ambient light conditions 34 (FIG. 5) from ambient light sensor 22 (FIG. 1). Control circuitry 42 may gather one or more ambient light measurements just prior to display 40 being turned on, in response to display 40 being turned on, or in response to any other suitable action (e.g., in response to motion sensor data 90 indicating that device 10 is being placed on a user's head). In other arrangements, control circuitry 42 may use predetermined brightness curves for display 40 and/or lighting system 60 that shift over time from bright-adapted to dark-adapted. Predetermined brightness curves for display 40 and/or lighting system 60 may, for example, be based on user studies or other information (e.g., curves 72, 74, 76, and 78 may be based on a typical adaptation shift for users that transition from bright indoor lighting to dim head-mounted display lighting).

In some arrangements, it may be desirable to drive or guide a user's adaptation state from one level to another level. For example, when a user is transitioning out of a head-mounted display viewing experience (e.g. when a movie or video ends, when a user enters a home screen or otherwise indicates the viewing experience is nearing an end, etc.), it may be desirable to direct the user's adaptation level from dark to bright so that the user does not experience dazzle or discomfort upon removing device 10 from his or her eyes.

Figure 7:
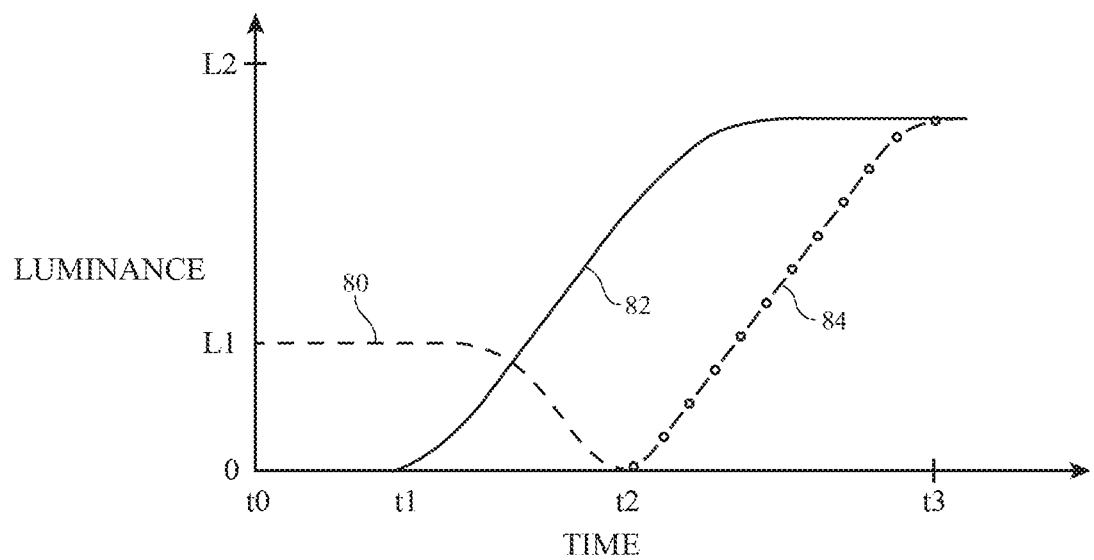
FIG. 7 is a graph showing how a lighting system may be used to help a user transition from a dark-adapted state to a bright-adapted state before the user removes a head-mounted device from his or her head in accordance with an embodiment.

This type of scenario is illustrated in FIG. 7. In this example, curve 80 is an illustrative brightness curve for display 40, and curves 82 and 84 are illustrative brightness curves for lighting system 60. From time t0 to time t1, the user is viewing content on display 40 and is dark-adapted at adaptation state L1. Content on display 40 is optimized for adaptation state L1. At time t1, information from input-output devices 18 and/or control circuitry 42 may indicate that the viewing experience is over or coming to an end. This may include, for example, user input that causes display 40 to pause or stop video, user input that results in a home screen being displayed on display 40, control circuitry 42 indicating a movie or other video has ended, or other information indicating that the viewing experience is over or nearly over. From time t1 to time t2, the brightness of display 40 may decrease to zero when the display is turned off.

In some arrangements, lighting system 60 may follow curve 82. In this type of arrangement, lighting system 60 is turned on at time t1 (e.g., in response to information from input-output devices 18 and/or control circuitry 42 indicating that the viewing experience is over or coming to an end). The brightness of lighting system 60 may gradually increase from zero at time t1 to L2 at time t2. This may ensure that the user is bright-adapted before removing device 10 and encountering bright ambient light.

In some arrangements, lighting system 60 may follow curve 84. In this type of arrangement, lighting system 60 is turned on at time t2, just when display 40 is turned off. The brightness of lighting system 60 may gradually increase from zero at time t2 to L2 at time t3. This may ensure that the user is bright-adapted before removing device 10 and encountering bright ambient light.

As described above, one aspect of the present technology is the gathering and use of data available from various sources to improve the displaying of content. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to gradually transition from bright ambient lighting conditions to dark ambient lighting conditions and vice versa. Accordingly, use of such personal information data allows for a more comfortable viewing experience. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of gathering information about physiological attributes of the user, the present technology can be configured to allow users to select to "opt in" or "opt out" of participation in the collection of personal information data during registration for services. In another example, users can select not to provide physiological data. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, physiological information can be inferred based on non-personal information data or a bare minimum amount of personal information, or based on publically available information.

The present disclosure also contemplates that head-mounted devices may be used to display different types of content including virtual reality content, augmented reality content, and mixed reality content. In some cases, the displayed content may be merged with a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtual-reality ("virtuality") continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. An electronic device configured to be worn on a user's head, comprising:
    an ambient light sensor that measures an ambient light brightness outside of the electronic device;
    a display that generates display content;
    an optical system through which the display content is viewable;
    a lighting system that provides illumination around a periphery of the optical system; and
    control circuitry that adjusts a brightness of the illumination based on the ambient light brightness, wherein the control circuitry reduces the brightness of the illumination when the display begins generating display content.

2. The electronic device defined in claim 1 wherein the lighting system comprises light-emitting diodes.

3. The electronic device defined in claim 2 wherein the light-emitting diodes are distributed in a loop that extends around the periphery of the optical system.

4. The electronic device defined in claim 2 wherein the light-emitting diodes comprise red, green, and blue light-emitting diodes.

5. The electronic device defined in claim 4 wherein the ambient light sensor measures an ambient light color and wherein the control circuitry adjusts a color of the illumination based on the ambient light color.

6. The electronic device defined in claim 4 wherein the control circuitry adjusts a color of the illumination based on the display content.

7. The electronic device defined in claim 1 wherein the lighting system comprises a light guide and a light source that emits light into the light guide.

8. The electronic device defined in claim 7 wherein the light guide forms a loop that extends around the periphery of the optical system.

9. The electronic device defined in claim 8 wherein the light guide has light extraction features that allow the light to escape from the light guide to provide the illumination.

10. The electronic device defined in claim 1 further comprising a motion sensor that produces motion sensor data, wherein the control circuitry adjusts the brightness of the illumination based on the motion sensor data.

11. An electronic device configured to be worn on a user's head, comprising:
    a display that generates display content;
    an optical system through which the display content is viewable;
    light sources adjacent to the optical system; and
    control circuitry that turns on the light sources before turning on the display.

12. The electronic device defined in claim 11 wherein the optical system comprises lenses and wherein the light sources are distributed in a loop surrounding the lenses.

13. The electronic device defined in claim 12 wherein the light sources comprise light-emitting diodes.

14. The electronic device defined in claim 11 wherein the control circuitry turns off the light sources when the display reaches a given brightness level.

15. The electronic device defined in claim 11 wherein the light sources are configured to illuminate the user's peripheral vision when the electronic device is worn on the user's head.

16. A method for operating an electronic device configured to be worn on a user's head, wherein the electronic device comprises a display that displays virtual reality content and an optical system through which the virtual reality content is viewable, the method comprising:
    with an ambient light sensor, measuring ambient light brightness outside of the electronic device;
    with a light source, illuminating a periphery of the optical system while the display is powered off; and
    with control circuitry, determining a brightness of the light source based on the ambient light brightness.

17. The method defined in claim 16, further comprising: decreasing the brightness of the light source from a first brightness level to a second brightness level.

18. The method defined in claim 17, further comprising: when the brightness of the light source reaches the second brightness level, turning on the display.

19. The method defined in claim 18, further comprising: after turning on the display, turning off the light source.

20. The method defined in claim 19, further comprising: increasing the brightness of the light source before the electronic device is removed from the user's head.

* * * * *